June 25, 1935.  J. F. KOPSA  2,006,244
LIQUID SEPARATING DEVICE
Filed July 10, 1933   2 Sheets-Sheet 1
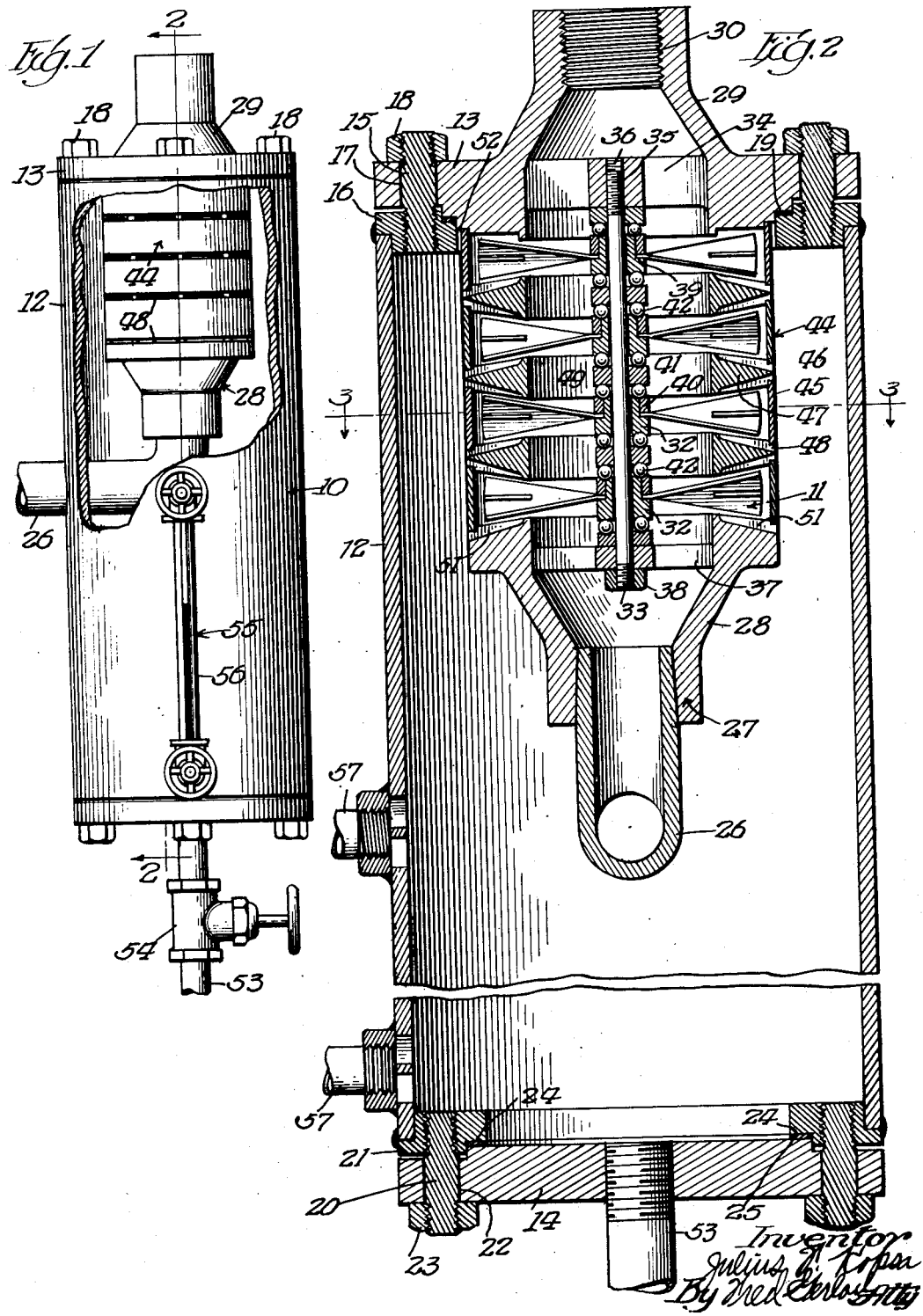

June 25, 1935.   J. F. KOPSA   2,006,244
LIQUID SEPARATING DEVICE
Filed July 10, 1933   2 Sheets-Sheet 2
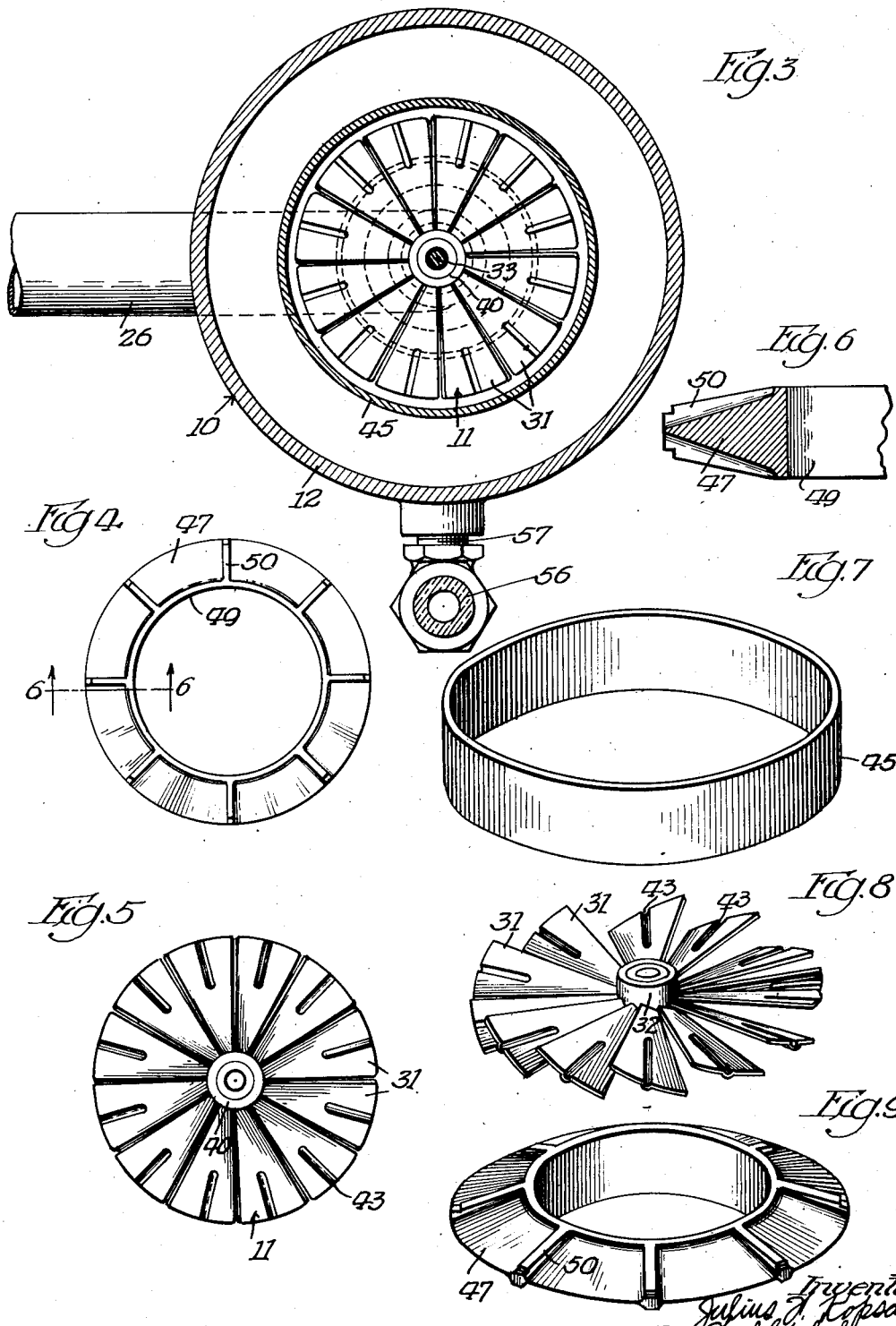

Patented June 25, 1935

2,006,244

UNITED STATES PATENT OFFICE 2,006,244

LIQUID-SEPARATING DEVICE

Julius F. Kopsa, Chicago, Ill.

Application July 10, 1933, Serial No. 679,674

REISSUED

8 Claims. (Cl. 183—77)

The present invention relates generally to devices for separating or disuniting liquid in suspension from gas under pressure. More particularly, the invention relates to that type of liquid-separating device which comprises (1) an elongated, vertically extending casing having inlet and outlet nipples whereby the gas from which the liquid is to be separated or disunited is introduced and permitted to flow vertically through the casing; and (2) a plurality of circular deflectors which are mounted in the casing between the inlet and outlet nipples to rotate on a vertical axis and have radially extending blades whereby they are caused to rotate in response to flow of the gas through the casing and the liquid in suspension is thrown outwardly and removed from the gas by centrifugal force.

One object of the invention is to provide a device of this type which is generally an improvement upon and is more efficient in operation than previously designed devices for the same purpose, consists of but a small number of parts and may be manufactured at a low and reasonable cost.

Another object of the invention is to provide a liquid-separating device of the type under consideration in which the inlet nipple for introducing the gas into the casing extends through the central portion of the side wall of the casing and the outlet nipple is located at the top of the casing so that the gas flows upwardly through the upper portion of the casing and the lower portion of the casing forms a tank or reservoir for the liquid which is separated or disunited from the gas as the latter flows upwardly to the outlet nipple and is subjected to the action of the rotatable, blade-equipped deflectors.

Another object of the invention is to provide a liquid-separating device of the last mentioned character in which the upper end of the casing is closed by means of a removable plate and the blade-equipped deflectors are rotatably mounted on a shaft which is connected to and depends from this plate so that they are removable as a unit from their operative position for inspection or repair purposes when the plate is removed from the casing.

A further object of the invention is to provide a liquid-separating device of the last mentioned character in which the deflectors are surrounded by a cylindrical shell which is of less diameter than, and is positioned centrally in the upper end of, the casing and consists of a plurality of rings which are positioned one above the other and are spaced apart to provide openings through which the liquid thrown outwardly by the deflectors may pass.

A still further object of the invention is to provide a liquid-separating device of the type and character under consideration in which the rings which form the cylindrical shell around the blade-equipped deflectors are spaced apart by means of washer-shaped elements which encircle the shaft depending from the removable plate at the upper end of the casing and have the top and bottom faces thereof shaped and arranged to guide the liquid from the blades on the deflectors to the openings between the rings.

Additionally, it is contemplated as one of the objects of the invention to provide a device for separating liquid in suspension from gas under pressure in which the various parts thereof are arranged compactly and in a novel manner.

Other objects of the invention and the various advantages and characteristics of the present liquid-separating device will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of a liquid-separating device embodying the invention, parts of the casing of the device being broken away and shown in section for purposes of illustration;

Figure 2 is an enlarged vertical section illustrating in detail the arrangement of the blade-equipped deflectors and the construction of the casing;

Figure 3 is a horizontal section on the line 3—3 of Figure 2;

Figure 4 is a top view of one of the washer-shaped elements which serve to space apart the rings of the shell and guide the liquid to the openings between the rings;

Figure 5 is a top view of one of the deflectors disclosing the construction and arrangement of the radially extending blades;

Figure 6 is an enlarged vertical section on the line 6—6 of Figure 4;

Figure 7 is a perspective of one of the rings which forms the shell around the deflector;

Figure 8 is a perspective of one of the deflectors; and

Figure 9 is a perspective of one of the washer-shaped elements which serve as spacers for the rings.

The device which forms the subject matter of the invention is adapted to separate or disunite liquid in suspension from a gas under pressure. It is in the form of a unitary structure and comprises an elongated, vertically extending casing 10 and a vertical series of rotatable deflectors 11. The casing surrounds the deflectors and consists of a cylindrical side wall 12, a circular top plate 13 and a circular bottom plate 14. The top plate 13 serves to close the upper end of the cylindrical side wall 12 of the casing and is removably secured in place by means of an annular series of studs 15. The latter are connected to and extend upwardly from a ring 16 and project through holes 17 in the margin of the top plate 13. Nuts 18 on the upper ends of the studs hold the top plate 13 in clamped relation with the ring 16. This ring as shown in Figure 2 of the drawing, is welded to and extends inwardly from the upper end of the cylindrical side wall 12 of the casing 10. An annular gasket 19 fits between opposed shoulders on the top plate 13 and the ring 16 and forms a seal for preventing leakage between said plate and ring. The bottom plate 14 serves as a closure for the lower end of the side wall of the casing 10 and is removably secured in place by an annular series of studs 20. The latter are secured to and extend downwardly from a ring 21 and project through circular holes 22 in the margin of the bottom head 14. Nuts 23 on the lower ends of the studs clamp the head 14 against the ring 21. When the nuts are removed from the studs 22, the bottom head 14 may be removed to provide access to the lower end of the casing. The ring 21 extends inwardly from and is welded to the lower end of the side wall 12 of the casing and embodies a seat 24 for an annular gasket 25. The latter, as shown in Figure 2 of the drawings, fits against the top face of the bottom plate 14 and forms a seal whereby leakage is prevented between the bottom plate and the ring 21. The cylindrical side wall 12 of the casing is preferably formed from a length of steel tubing.

The gas from which the liquid in suspension is to be separated or disunited is introduced into the casing 10 by way of an inlet nipple 26. This nipple extends through a circular hole in the central portion of the side wall 12 of the casing and is welded to the side wall so that it is permanently connected thereto. The inner end of the nipple 26 is bent upwardly as shown in Figure 1 and fits slidably in and discharges into a tubular bottom extension 27 on a hollow cast metal head 28. The central portion of the top plate 13 which forms a closure for the upper end of the casing 10 is shaped to form an upwardly extending outlet nipple 29. This nipple is provided with an internal or female screw thread 30 whereby it may be connected to a pipe or like element. The gas which enters the casing via the inlet nipple 26 flows upwardly into the hollow head 28 and then after being subjected to the action of the deflectors 14, as hereinafter described, flows out of the casing by way of the outlet nipple 29.

The deflectors 11 are formed of disks of sheet metal and are slit radially and bent or twisted so that they embody radially extending, angularly disposed blades 31. They embody in addition to the blades 31, hubs 32 and are mounted for horizontal rotation on a vertically extending shaft 33. The latter is longitudinally aligned with the inlet and outlet nipples 26 and 29 and is secured to and depends from a crossbar 34. The latter, as shown in Figure 2, is formed integrally with the top plate 13 for closing the upper end of the casing 10 and extends diametrically across the lower end of the outlet nipple 29. The upper end of the shaft 33 fits within and is connected by a screw thread connection 35 to a vertical bore 36 in the central portion of the crossbar 34. The lower end of the shaft 33 extends through a crossbar 37 in the upper end of the head 28 and is provided with a nut 38 which underlies the crossbar and serves together with the shaft to support the hollow head 28 from the top plate 13. The hubs 32 of the deflectors 11 fit loosely around the shaft 33 and are cut away at the upper ends thereof so as to form flat, annular shoulders 39. The sheet metal disks from which the deflectors are formed are centrally apertured so as to fit around the reduced portions of the hubs and fit against the shoulders 39. Ferrules 40 are pressed around the reduced upper end portions of the hubs and serve to clamp the deflectors in place against the shoulders and in locked relation with the hubs. The deflectors 11 are spaced apart by means of collars 41 which are shrunk or otherwise fixedly secured to the shaft 33. An annular series of balls 42 are disposed between the collars and the hubs 32 and form anti-friction bearings whereby the deflectors are free to revolve around the shaft 33. The gas from which any liquid in suspension is to be separated or disunited, strikes against the deflectors 11 as it flows upwardly in the casing between the head 28 and the outlet nipple 29 and because of the angularity and shape of the blades 31 causes the deflectors to rotate. This rotation of the deflectors results in any liquid in suspension in the gas being thrown outwardly as the result of centrifugal action. In order to increase the efficiency of the deflectors, the central portions of the blades 31 are centrally deflected or shaped to form radially extending ribs 43. The latter operate in a measure as baffles and guide the liquid separated from the gas outwardly. The deflectors are preferably four in number. The blades of the bottom deflector and the one third from the bottom are twisted so that these two deflectors rotate in one direcion. The blades of the deflector second from the bottom and the one opposite the top cover of the casing are oppositely twisted so that these two deflectors rotate in the opposite direction. As a result of this construction, the gas is subjected to the action of deflectors, some of which rotate in one direction and others of which operate in the opposite direction, with the result that any and all liquid in suspension in the gas is effectively separated or disunited from the gas prior to passage of the gas into the outlet nipple.

For the purpose of guiding the gas from the inlet nipple 26 to the outlet nipple, a cylindrical shell 44 is provided. This shell surrounds the deflectors 11, consists of a plurality of superposed rings 45 and is of smaller diameter than the side wall 12 of the casing 10 so as to form an annular space 46 therebetween. The rings 45 correspond in number to the deflectors and are spaced vertically apart by means of washer-shaped elements 47 in order to form comparatively narrow openings 48 for permitting the liquid which is separated from the gas to pass outwardly from the shell into the annular space 46 at the upper end of the casing. The washer-shaped elements 47 are positioned between the deflectors 11 and have central apertures 49 of comparatively large diameter for permitting upward flow of the gas in the shell. The top faces of the elements extend downwardly and outwardly from the apertures 49 at an inclination corresponding to that of the bottom edges of the blades of the deflectors and serve to guide the liquid to the openings 48. The under faces of the elements 47 extend upwardly and outwardly from the apertures 49 at an inclination corresponding to that of the upper edges of the blades of the deflector and serve to guide any liquid which is thrown upwardly and outwardly by the blades to the openings 48 between the shell-forming rings 45. Radially extending ribs 50 are formed on the bottom and top faces of the washer-shaped elements and have the outer ends thereof cut away or notched to receive the edges of the rings 45. These ribs serve as the spacing means for the rings and serve to locate the elements 47 centrally with respect to the shell 44. The top face of the head 28 extends downwardly and outwardly so as to form a deflecting surface for the blades of the bottom deflector and has radially extending ribs 51 which are cut away or notched at the outer ends thereof and receive the lower edge of the lowermost, shell-forming ring 45. The rings 45 are built up on the hollow head 28 and the uppermost ring fits within an annular groove 52 in the bottom face of the top plate 13. The nut 38 at the lower end of the shaft 33 operates, when tightened, to exert clamping pressure upon the head 28 and to jamb or clamp the shell-forming rings and the washer-shaped elements 47 into locked relation.

The liquid which is separated from the gas by the blades 31 on the deflectors 11 and is thrown outwardly into the annular space 46 via the narrow openings 48 between the shell-forming rings 45 drops downwardly into the bottom portion of the casing 10 which serves as a reservoir or tank. A pipe 53 which is connected to and leads downwardly from the bottom plate 14 permits the accumulated liquid in the bottom of the casing to be drained away. This pipe, as shown in Figure 1 of the drawings is provided with a valve 54 whereby it may be closed or opened. In order that the amount of liquid in the casing bottom may be ascertained from the outside of the casing, a gauge 55 is provided. This gauge consists of a vertically extending, transparent tube 56 the upper and lower ends of which communicate with the interior of the casing by way of valve-controlled, pipe sections 57.

The device is assembled by welding the rings 16 and 21 to the ends of the cylindrical side wall 12 of the casing and then mounting the various parts, such as the gauge 55 and the bottom plate 14, in place. The top plate 13, after assembly of the deflectors on the shaft 33 and mounting in place of the shell-forming rings 45 and the washer-shaped elements 47, is placed over the ring 16 and is dropped downwardly so as to bring the studs 15 through the holes 17. During lowering of the top plate, the extension 27 on the lower end of the hollow head 28 slides into engagement with the upwardly extending inner end of the inlet nipple 26.

The operation of the device is as follows:
When gas under pressure is permitted to flow to the inlet nipple 26, it flows upwardly into the hollow head 28 and then passes through the shell to the outlet nipple 29. As the gas flows upwardly through the shell, it strikes or impinges against the blades 31 of the deflectors and causes the deflectors to rotate. As a result of rotation of the deflectors, any liquid in suspension in the gas is thrown outwardly as the result of centrifugal force and is guided through the narrow openings 48 by the washer-shaped elements 47. After being discharged or thrown through the openings 48, the liquid drops to the bottom of the casing where it remains until the casing is emptied by opening of the valve 54.

The herein described separating device is extremely efficient in operation and because of the fact that it embodies but a small number of parts may be manufactured at a low and reasonable cost. It is in the nature of a unitary structure and may be used effectively between the compressor and the condenser of a refrigerating system to remove any oil or water in the refrigerant prior to passage of the refrigerant to the evaporating coil, or it may be used in the outlet pipe for an oil lubricated, centrifugal compressor for removing oil from the compressed fluid.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a device for separating liquid in suspension from gas, the combination of an elongated, vertical extending casing, a tubular, vertically extending shell disposed in the casing in spaced relation with respect to the side wall thereof and provided with circumferential side openings, means associated with the casing for directing the gas vertically through the shell, a deflector mounted in the shell for rotation on a vertical axis and having radially extending blades whereby it is caused to rotate in response to passage of the gas through the shell and the liquid in suspension is caused by centrifugal force to be thrown outwardly, and a washer-shaped element disposed wholly within the shell and so that it underlies the blades of the deflector and having an outwardly and downwardly inclined top face for directing the liquid thrown outwardly by the deflector through the side openings in the shell and into the space between the shell and the side wall of the casing.

2. In a device for separating liquid in suspension from gas, the combination of an elongated, vertically extending casing, a tubular, vertically extending shell disposed in the casing in spaced relation with respect to the side wall thereof and provided with side openings, means associated with the casing for directing the gas vertically through the shell, a deflector mounted in the shell for rotation on a vertical axis and having radially extending blades whereby it is caused to rotate in response to passage of the gas through the shell and the liquid in suspension is caused by centrifugal force to be thrown outwardly, and washer-shaped elements above and below the blades of the deflector having opposed inclined faces for directing the liquid thrown outwardly by the deflector through the side openings in the shell and into the space between the shell and the side wall of the casing.

3. In a device for separating liquid in suspension from gas, the combination of an elongated, vertically extending casing, a tubular, vertically extending shell disposed in the casing in spaced relation with respect to the side wall thereof and provided with side openings, means associated with the casing for directing the gas longitudinally through the shell, a plurality of deflectors mounted in the shell for rotation on a vertical axis and having radially extending, angularly shaped blades whereby they are caused to rotate in response to passage of the gas through the shell and the liquid in suspension is caused by centrifugal force to be thrown outwardly, and outwardly tapered, washer-shaped elements disposed wholly within the shell and between the deflectors and arranged to direct the liquid thrown outwardly through the side openings in the shell and into the space between the shell and the side wall of the casing.

4. In a device for separating liquid in suspension from gas, the combination of a casing, a tubular shell disposed in the casing in spaced relation with respect to the side wall thereof and consisting of a plurality of coaxial rings, means associated with the casing for directing the gas through the shell, a series of deflectors mounted in the shell for rotation transversely thereof and having radially extending, angularly disposed blades whereby they are caused to rotate in response to passage of the gas through the shell and the liquid in suspension is caused by centrifugal force to be thrown outwardly, means between the deflectors and inwardly of the shell-forming rings for spacing the latter small distances apart to form side openings whereby the liquid thrown outwardly by the deflectors is permitted to pass into the space between the shell and the side wall of the casing and clamping means applied to the end rings for holding the rings in assembled and unit relation.

5. In a device for separating liquid in suspension from gas, the combination of a casing, a tubular shell disposed in the casing in spaced relation with respect to the side wall thereof and consisting of a plurality of coaxial rings, means associated with the casing for directing the gas through the shell, a series of deflectors mounted in the shell for rotation transversely thereof and having radially extending, angularly disposed blades whereby they are caused to rotate in response to passage of the gas through the shell and the liquid in suspension is caused by centrifugal force to be thrown outwardly, and washer-shaped elements between the deflectors and constructed to space the shell-forming rings small distances apart to form discharge openings for the liquid thrown outwardly by the deflectors and to guide such liquid through the openings.

6. In a device for separating liquid in suspension from gas, the combination of an elongated, vertically extending casing provided with a removable closure member at its upper end, means for directing the gas upwardly through the casing including an inlet nipple in the bottom portion of the casing and an outlet nipple on the closure member, a hollow head mounted slidably on and communicating with the inner inlet end of the inner nipple, a vertical shaft extending between and connected to the central portions of the closure member and said head and adapted together with said head to be withdrawn from the upper end of the casing upon removal of the closure member, and a plurality of horizontally extending deflectors mounted rotatably on the shaft and having radially extending blades whereby they are caused to rotate in response to passage of the gas through the casing and the liquid in suspension is caused to be thrown outwardly and separated from the gas by centrifugal force.

7. In a device for separating liquid in suspension from gas, the combination of an elongated, vertically extending casing provided with a removable closure member at its upper end an inlet nipple extending through the side wall of the casing and provided with an upwardly extending inner end, an outlet nipple in said closure member and serving with the inlet nipple to permit upward flow of the gas through the casing, a hollow head disposed in the casing and mounted on and communicating with the inner end of the inlet nipple, a tubular, vertically extending shell of reduced width positioned in the casing in clamped relation between the hollow head and said closure member and spaced from the side wall of the casing and having side openings therein, a vertical shaft extending through the shell and having the upper end thereof connected to the closure member and its lower end attached to the head so as to support the latter together with the shell, and horizontally extending deflectors mounted rotatably on the shaft and having radially extending blades whereby they are adapted to rotate in response to passage of the gas through the casing and the liquid in suspension is caused to be thrown outwardly and separated from the gas by centrifugal force.

8. In a device for separating liquid in suspension from gas, the combination of an elongated, vertically extending casing, provided with removable closure members at the ends thereof, means for directing the gas longitudinally through the casing consisting of an inlet nipple extending through the side wall of the casing and provided with an upwardly extending inner end and an outlet nipple formed as a part of the upper closure member, a hollow head disposed in the casing and mounted slidably on and communicating with the inner end of the inlet nipple, a tubular vertically extending shell of reduced width positioned in the casing between the hollow head and said upper closure member, and so that it is spaced from the side wall of the casing and having side openings therein, a vertical shaft in the shell extending between and connecting together said upper closure member and the hollow head and serving to hold said member and head in clamped relation against the shell and to remove as a unit the shell and head upon removal of the upper closure member from the casing, and a horizontally extending deflector mounted rotatably on the shaft and having radially extending blades whereby it is adapted to rotate in response to passage of the gas through the casing and the liquid in suspension is caused to be thrown outwardly through the side openings in the shell and thus separated from the gas by centrifugal force.

JULIUS F. KOPSA.